United States Patent [19]

Rogoff et al.

[11] Patent Number: 4,590,569
[45] Date of Patent: May 20, 1986

[54] NAVIGATION SYSTEM INCLUDING AN INTEGRATED ELECTRONIC CHART DISPLAY

[75] Inventors: Mortimer Rogoff, Washington, D.C.; Peter M. Winkler, Atlanta, Ga.; John N. Ackley, Saline, Mich.

[73] Assignee: Navigation Sciences Inc., Bethesda, Md.

[21] Appl. No.: 542,165

[22] Filed: Oct. 14, 1983

[51] Int. Cl.⁴ .................. G06F 15/50; G01S 7/06
[52] U.S. Cl. .................. 364/452; 364/449; 364/521; 343/6 R; 340/990
[58] Field of Search ......... 364/452, 453, 449, 460, 364/521, 443; 340/990, 995; 343/6 TV, 388, 389

[56] References Cited

U.S. PATENT DOCUMENTS

| | | | |
|---|---|---|---|
| 4,081,802 | 3/1978 | Elmore et al. | 343/6 TV |
| 4,318,105 | 3/1982 | Brodeur | 343/389 |
| 4,428,052 | 1/1984 | Robinson et al. | 364/436 |
| 4,428,057 | 1/1984 | Setliff et al. | 364/452 |

*Primary Examiner*—Felix D. Gruber
*Assistant Examiner*—Thomas G. Black
*Attorney, Agent, or Firm*—Brady, O'Boyle & Gates

[57] ABSTRACT

A navigation system particularly adapted for ships making a passing within a harbor or the like, utilizing signal inputs from on-board vessel position determining equipment such as Loran or Decca apparatus and an on-board object detecting equipment such as a radar or sonar apparatus. The system further includes an on-board vessel position computer which operates in a differential Loran mode in response to observed Loran time differences, stored data from an initial calibration, and Loran grid offset data from an on-shore monitor system to compute a highly accurate current or present position fix in longitude and latitude whereupon the computer causes a predetermined electronic chart to be displayed in color on the screen of a cathode ray tube, being generated from a plurality of electronic charts stored in the form of digital files in memory. The selected chart, together with the present position of the ship, is displayed along with preselected alpha-numeric indicia of data relating to bearings, way points, ranges, "time to go", etc., also generated in accordance with the computed vessel position. Radar target returns of the local land mass and other stationary moving targets are additionally received by the ship's radar. The radar image of the target echoes is next referenced to and superimposed on the electronic chart generated; however, the radar's land mass echoes are suppressed in favor of the electronic chart land mass while displaying all other targets.

41 Claims, 6 Drawing Figures

Microfiche Appendix Included
(76 Microfiche, 1 Pages)

NAVIGATION SYSTEM INCLUDING AN INTEGRATED ELECTRONIC CHART DISPLAY

BACKGROUND OF THE INVENTION

1. Field of the Invention

This invention relates generally to on-board navigational systems and more particularly to the type of navigational systems which continuously display in a plan view the present position of a navigating vehicle in relation to its surrounding environment, such as a ship making a passage within a channel or a harbor or the like.

2. Prior Art

Position fixing systems are generally well known and include such systems as Loran and Decca as well as radar, Omega, satellite and inertial navigation systems.

The Loran system is particularly useful because of the high inherent accuracy of the system. In Loran, radio pulses are generated at each of three stations, one station acting as the master for timing purposes, and at least two others, called secondaries, that establish differetial time and thereby vessel position. At the receiving location, the master signal is received first, followed in succession by two or more secondary signals. The difference in time of arrival between the master signal and each of the secondary signals determines the position of the vessel. Each pair of time differences give rise to a family of hyperbolic loci having intersections that mark the position of the vessel. This is a well known form of hyperbolic navigation utilizing a network of hyperbolic lines of position wherein each hyperbolic line represents the locus of all points that possess predicted equal differences in time of arrival between master and secondary. The family of loci of position forms what is commonly referred to as a "grid" which can visually be depicted, for example, by being overprinted as a set of hyperbolas on nautical charts. High accuracy of the time difference measurement is further achieved by phase comparison of the RF carrier within the pulse transmission. Such a system is known as the Loran-C system.

Notwithstanding, Loran is subject to certain anomalies in the propagation delay from predicted values which cause shifts in the Loran grid. Such shifts can amount to position errors and uncertainties of the order of a few hundred yards or more, which can vary over a twelve month cycle. While such errors can be tolerated in certain areas such as in open water, this is not the case where it is desirable to use Loran for navigation within a very narrow channel in a harbor, along a coastline, or within a river.

Accordingly, it is an object of the present invention to provide an improvement in vehicle navigational systems.

It is another object of the present invention to provide an improvement in the accuracy of a navigational system employing a positional fix system including a navigational display.

Still another object of the present invention is to combine two different forms of radio location apparatus and generate therefrom an integrated navigational display.

And yet a further object of the present invention is to combine an on-board differential Loran system with an on-board radar system and generate therefrom an integrated navigational display from an electronic chart stored in memory and generated in accordance with the present vessel position and further superimposing detected radar targets on the chart while suppressing the land mass echoes detected by the radar.

SUMMARY OF THE INVENTION

Briefly, a vehicle navigation system is disclosed employing both a highly accurate means for fixing positions and an object detection system along with an integrated electronic display comprising a navigational chart generated from a plurality of electronic charts stored as files in a chart memory and generated in accordance with present computed position of the vehicle as well as local objects which must be observed and/or avoided during transit along a desired course. The system is particularly adapted for combining Loran with radar where ship navigation is desired within a predefined area such as a harbor. In a Loran embodiment, a set of surveyed calibration points at selected locations within the harbor, for example, are initially used to determine virtual base line shifts between a master station and two secondary stations which are stored in memory and subsequently used to calculate vessel position. A plurality of selectively located Loran monitors operate on-shore to track any shift of the Loran grid within the area and periodically transmit offset data of the grid shift to the Loran position fixing system on-board the vessel. An on-board Loran computer, in a differential mode of operation, calculates the vessel's present longitude and latitude at periodic intervals in response to: (a) observed Loran time differences; (b) any monitored grid shift offsets from a reference value; and (c) the virtual base line shifts and coordinates of a selected number, preferably three, of the nearest calibration points. An appropriate electronic navigational chart is retrieved from the chart memory and generated as a color CRT display together with a graphic of the present vessel position and selected alpha-numeric steering and positioning information. Simultaneously the on-board object detection system, e.g. radar, generates a radar image of the area including fixed and moving targets. These targets are first referenced to the coordinates of the navigational chart displayed and thereafter integrated therewith. The integration is achieved by means which operates to further suppress the shore line and adjoining land mass echoes in favor of that provided by the electronic chart.

BRIEF DESCRIPTION OF THE DRAWINGS

While the present invention is defined in the claims annexed to and forming a part of this specification, a better understanding can be had by reference to the following detailed description of the invention taken in conjunction with the accompanying drawings in which:

DETAILED DESCRIPTION OF THE INVENTION

Figure 1:
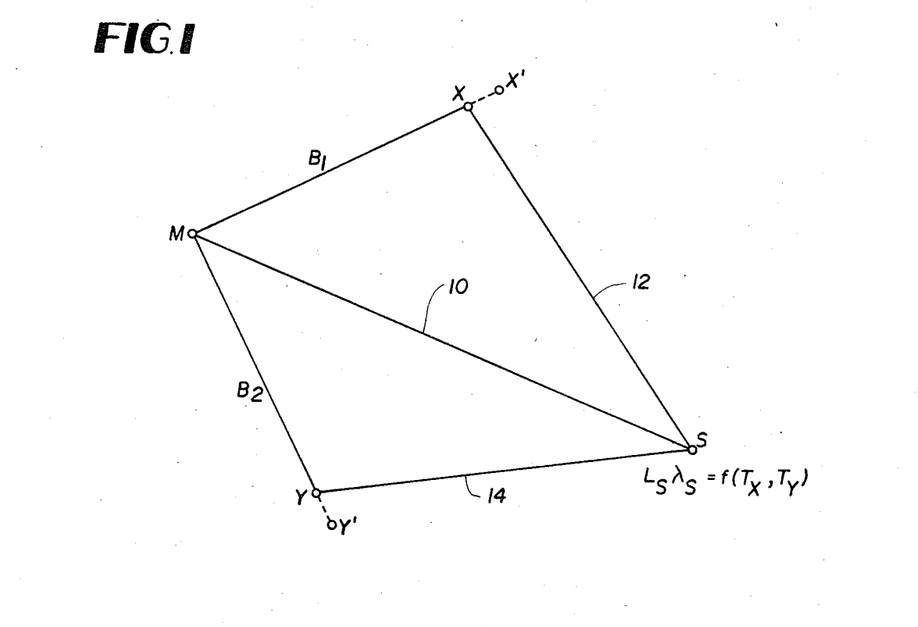
FIG. 1 is a diagram generally illustrative of Loran and the calibration procedure followed in the subject invention.

Referring now to the drawings and more particularly to FIG. 1, there is disclosed among other things, a triangulation diagram typically illustrative of a Loran navigational system which is operable to provide highly accurate position fixes applicable to land, sea or aircraft. In the present invention the craft comprises, for purposes of illustration but not limitation, a vehicle such as a ship making a passage in a relatively narrow waterway such as a channel in a harbor or the like.

In general, and as shown in FIG. 1, a Loran navigation system employs the reception of radio pulses received by the vessel or ship S from three stations, a master station M, and two secondary stations X and Y, which are respectively separated from the master station M by the base line distances $B_1$ and $B_2$. At the receiving location S the master signal is received first over the signal path 10 followed in succession by signals from secondary stations X and Y over the paths 12 and 14. As is well known, the difference in time of arrival between the master signal and each of the secondary signals, i.e., $T_x$ and $T_y$, as referenced to predicted values along the hyperbolic Loran grid, is adapted to determine the position of the vessel S in longitude $L_s$ and latitude $\lambda_s$.

In order to obtain accurate position fixes, however, a number of compensations have to be made for the departure of the Loran grid from its predicted location due to various distorting factors. Among these are the following: (1) Radio waves traveling along the surface of the earth, i.e., the ground wave component of the signal, have their velocity of of propagation effected by the conductivity of the earth over which the signal is passing. Since the path occupied by the radio signal will vary as the receiving location, for example the vessel S in FIG. 1 changes its location, the signals can be affected by varying propagation as the receiver location moves from one place to another. This change in velocity affects the measured differential time of arrival as observed at the position S, creating the possibility of error in position determination. (2) Any changes in transmitter signal timing, especially in relative timing between transmitters, caused by climate changes and signal propagation changes between the master M and the secondaries X and Y, will create errors in the computed position of the vessel S. (3) Any changes in the differential time measurement occurring in the receiver will cause errors in the computation of location.

Presently, Loran systems rely upon the prediction of the time of arrival of radio signals on any place on the earth's surface based upon the knowledge of the earth's conductivity along the route traveled by these radio signals. Propagation velocity is inferred from the values of earth's conductivity measurements that have been previously collected. Various mathematical means are employed to convert these conductivity values into propagation velocities in order to prepare tables or charts illustrating the grid which locates the intersections of hyperbolic lines of position. Unfortunately, the accuracy with which conductivity is known along any specific path between a transmitter and receiver is of a sufficiently low order to restrain the system to accuracies that do not exceed one quarter of a nautical mile.

As a consequence, conventional Loran systems are not used in harbors, rivers or other waters where vessel locations must be known to greater accuracy. Similarly, it cannot be used by land vehicles or aircraft where in the case of land vehicles locations are required to an accuracy of a few feet and in the case of aircraft where positions must be known within a few feet, especially during landing.

In order to overcome this limitation and increase the accuracy of position fixing, the present invention utilizes a calibration process involving a set of accurately surveyed Loran navigation calibration points typically spaced at intervals in the water ranging between one quarter of a mile and one mile, typically every 500 yards, and an on-shore Loran grid shift monitoring system within a predefined region of use. Typically, the predefined area of use comprises a harbor channel, a harbor entrance, an extensive channel in a river, a coastal area or other similar locations.

Following calibration, at least three fixed Loran monitor receivers are installed on-shore in the vicinity of the calibration points and are used thereafter to provide a correction to the observed Loran time differences that occur as a result of the local Loran grid shift. Each monitor, as will be shown, periodically operates to measure time differences at its respective location. The time differences are compared to establish the existence of a shift. The deviation or offset from a previously established reference value of one of the monitors is then communicated to Loran receiving equipment located, for example, on ships or vessels traveling within the specified area of operation so that it may be taken into account when making a position determination as will be explained.

The principle of calibration utilized can be understood with reference to FIG. 1. During the calibration process, the time differences $T_x$ and $T_y$ between signals received from the master M and the two secondary stations X and Y at a plurality of accurately surveyed points or locations S in the water are noted and recorded as well as the longitude L and latitude $\lambda$ of the respective point. As is known, the secondary stations X and Y transmit after having received a signal transmitted from the master station M over the base lines $B_1$ and $B_2$. Thus signals are transmitted from the secondary stations X and Y after a time which is a function of the delay along the base line plus a coding delay. A calculation is then made of the required separation along the base lines $B_1$ and $B_2$ would account for each of the two received time differences using the coordinates in L and $\lambda$ of the observed position and the time differences measured thereat as given quantities. In other words, secondary stations X and Y are moved to virtual positions, X' and Y' as shown in FIG. 1, along their respective base lines, $B_1$ and $B_2$ by an incremental distance measured in time along $D'_x$ and $D'_y$ which would be necessary to account for the observed time difference. These shifts along the base lines $B_1$ and $B_2$ for each calibrating point represent calibrating offsets which are stored in a memory and are used in a manner to be described to determine present position.

With the knowledge of the virtual base line positions of X and Y at X' and Y' for the plurality of calibration points having respective coordinates L and $\lambda$, the corrected geometry can then be applied to Loran signals received and corrected for any grid shift in accordance with the following spherical trigonometric method of calculation.

Figure 2:
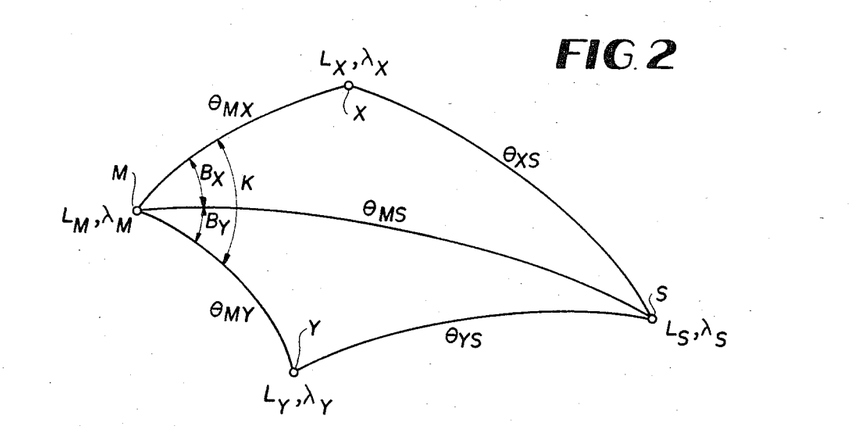
FIG. 2 is a diagram helpful in understanding the computation of actual position on the surface of the earth in accordance with measured Loran time differences.

With reference now to FIG. 2, the master station M has a latitude $L_m$ and longitude $\lambda_m$, while the secondary station X is located at $L_x$ and $\lambda_x$ and the other secondary station Y is located at $L_y$ and $\lambda_y$. The vessel's location is at $L_s$ and $\lambda_s$. Knowledge of the station locations, transmission delays and observed time differences, together with the radio propagation speed, places the vessel at an intersection of two spherical hyperbolas.

First knowing the station coordinates $L_m$, $\lambda_m$, $L_x$, $\lambda_x$, $L_y$, a set of calibration point coordinates $L_c$, $\lambda_c$ and the observed time differences $T_x{}^c$, $T_y{}^c$ at that calibration point, virtual base line delays $D'_x$ and $D'_y$ are calculated as follows:

Let V be the average propagation speed over water, and let $\theta_{mc}$, $\theta_{xc}$ and $\theta_{yc}$ be the distance (in degrees) between the transmitters and a calibration point located at $L_c$, $\lambda_c$.

From the well known great circle distance formula, $\cos\theta_{12} = \sin L_1 \sin L_2 + \cos L_1 \cos L_2 \cos(\lambda_1 - \lambda_2)$ $\theta_{mc}$, $\theta_{xc}$ and $\theta_{yc}$ are derived as, $$\theta_{mc} = \cos^{-1}[\sin L_m \sin L_c + \cos L_m \cos L_c \cos(\lambda_m - \lambda_c)] \quad (1)$$

$$\theta_{xc} = \cos^{-1}[\sin L_x \sin L_c + \cos L_x \cos L_c \cos(\lambda_x - \lambda_c)] \quad (2)$$

$$\theta_{yc} = \cos^{-1}[\sin L_y \sin L_c + \cos L_y \cos L_c \cos(\lambda_y - \lambda_c)] \quad (3)$$

Expressing in two ways the time between transmission of master signal and reception of the secondary singals, one obtains:

$$\theta_{mc}/C + T_x{}^c = D'_x + \theta_{xc}/V \quad (4)$$

$$\theta_{mc}/V + T_y{}^c = D'_y + \theta_{yc}/V \quad (5)$$

from which $$D'_x = T_x{}^c + \theta_{mc} - \theta_{xc}/V \quad (6)$$

$$D'_y = T_y{}^c + \theta_{mc} - \theta_{yc}/V \quad (7)$$

$D'_x$ and $D'_y$ are then used as base line delay values for navigation near the calibration point located at $L_c$, $\lambda_c$.

Further as shown in FIG. 2, $\theta_{ms}$, $\theta_{xs}$ and $\theta_{ys}$ are the distance, in degrees, from the transmitters M, X and Y to the vessel S and are unknown. $\theta_{mx}$ and $\theta_{my}$ are the distances from the master to each secondary, and are derived from the following great circle distances formulas as:

$$\theta_{mx} = \cos^{-1}[\sin L_m \sin L_x + \cos L_m \cos L_x \cos(\lambda_m - \lambda_x)] \quad (8)$$

$$\theta_{my} = \cos^{-1}[\sin L_m \sin L_y + \cos L_m \cos L_y \cos(\lambda_m - \lambda_y)] \quad (9)$$

The time elapsed between transmission, the signal from the master station and reception by the secondary stations, corrected for grid shift, can be expressed as, $$\theta_{ms}/V + T_x = D'_x + \theta_{xs}/V \quad (10)$$

$$\theta_{ms}/V + T_y = D'_y + \theta_{ys}/V \quad (11)$$

Defining $P_x = V(T_x - D'_x)$ and $P_y = V(T_y - D'_y)$, obtained is:

$$\theta_{xs} = \theta_{ms} + P_x \quad (12)$$

$$\theta_{ys} = \theta_{ms} + P_y \quad (13)$$

Taking cosines of both sides yields, $$\cos\theta_{xs} = \cos\theta_{ms}\cos P_x - \sin\theta_{ms}\sin P_x \quad (14)$$

$$\cos\theta_{ys} = \cos\theta_{ms}\cos P_y - \sin\theta_{ms}\sin P_y \quad (15)$$

Let $B_x$, $B_y$ and K be the angles indicated in FIG. 2. Applying the law of cosines to spherical triangles XMS and YMS yields, $$\cos\theta_{xs} = \cos\theta_{mx}\cos\theta_{ms} + \sin\theta_{mx}\sin\theta_{ms}\cos B_x \quad (16)$$

$$\cos\theta_{ys} = \cos\theta_{my}\cos\theta_{ms} + \sin\theta_{my}\sin\theta_{ms}\cos B_y \quad (17)$$

Equating the righthand sides of equations (14) through (17, the following expressions result, $$\cos\theta_{ms}(\cos P_x - \cos\theta_{mx}) = \sin\theta_{ms}(\sin P_x + \sin\theta_{mx}\cos B_x) \quad (18)$$

$$\cos\theta_{ms}(\cos P_y - \cos\theta_{my}) = \sin\theta_{ms}(\sin P_y + \sin\theta_{my}\cos B_y) \quad (19)$$

Each of the equations (18) and (19) gives an expression for $\tan\theta_{ms}$, so that $$\frac{\cos P_x - \cos\theta_{mx}}{\sin P_x + \sin\theta_{mx}\cos B_x} = \tan\theta_{ms} = \frac{\cos P_y - \cos\theta_{my}}{\sin P_y + \sin\theta_{my}\cos B_y} \quad (20)$$

To simplify equation (20), let $$a_x = \frac{\cos P_x - \cos\theta_{mx}}{\sin\theta_{mx}}$$

$$a_y = \frac{\cos P_y - \cos\theta_{my}}{\sin\theta_{my}}$$

$$b_x = \frac{\sin P_x}{\sin\theta_{mx}}$$

and $$b_y = \frac{\sin P_y}{\sin\theta_{my}}$$

so that $a_x$, $a_y$, $b_x$ and $b_y$ are all known quantities. Using a trigonometric identity to express $\cos B_y = \cos(K - B_x)$ and cross-multiplying the two large terms of (7) results in, $$a_y b_x - a_x b_y = -a_y \cos B_x + a_x \cos B_y = -a_y \cos B_x + a_x \quad (21)$$

$$[\cos K \cos B_x \pm \sin K \sqrt{1 - \cos^2 B_x}\,]$$

Since the angle K does not depend on the vessel's position or the observed time differences, it can be determined ahead of time from the MXY triangle via the law of cosines as:

$$K = \cos^{-1}\left(\frac{\cos\theta_{xy} - \cos\theta_{mx}\cos\theta_{my}}{\sin\theta_{mx}\sin\theta_{my}}\right) \quad (22)$$

where $\cos \theta_{xy} = \sin L_x \sin L_y + \cos L_x \cos L_y \cos (\lambda_x - \lambda_y)$.

Thus, $\cos B_x$ is the only unknown in the left and right sides of equation (8).

For convenience set, $$U_1 = a_x \cos K - a_y$$

$$U_2 = a_x \sin K$$

$$U_3 = a_y b_x - a_x b_y$$

so that equation (22) reduces to $$U_3 = U_1 \cos B_x \pm U_2 \sqrt{1 - \cos^2 B_x} \tag{23}$$

yielding, $$U_3{}^2 + U_1{}^2 \cos^2 B_x - 2U_3 U_1 \cos B_x = U_2{}^2 - U_2{}^2 \cos^2 B_x \tag{24}$$

which is a quadratic in $\cos B_x$, namely $$(U_1{}^2 - U_2{}^2) \cos^2 B_x + (-2U_3 U_1) \cos B_x + (U_3{}^2 - U_2{}^2) = 0 \tag{25}$$

so one gets, $$\cos B_x = \frac{U_1 U_3 \pm U_2 \cdot \sqrt{U_1{}^2 + U_2{}^2 + U_3{}^2}}{U_1{}^2 + U_2{}^2} \tag{26}$$

which will generally yield two real and acceptable values between $-1$ and $1$ for $\cos B_x$.

Going back to the left side of equation (21), one obtains $$\tan \theta_{ms} = \frac{\cos P_x - \cos \theta_{mx}}{\sin P_x + \sin \theta_{mx} \cos P_x} = \frac{a_x}{b_x + \cos B_x} \tag{27}$$

which will yield two values of $\theta_{ms}$ in the desired range $0°-180°$. The larger value of $\theta_{ms}$ is discarded.

Now taking $$\theta_{xs} = \theta_{ms} + P_x \tag{28}$$
$$\theta_{ys} = \theta_{ms} + P_y \tag{29}$$

the diagram is solved and it remains only to compute the actual coordinates $L_s$ and $\lambda_s$.

The distance formulas for $\theta_{ms}$, $\theta_{xs}$ and $\theta_{ys}$ yield, $$\cos \theta_{ms} = \sin L_m \sin L_s + \cos L_m \cos L_s \cos (\lambda_s - \lambda_m) \tag{30}$$

$$\cos \theta_{xs} = \sin L_x \sin L_s + \cos L_x \cos L_s \cos (\lambda_s - \lambda_x) \tag{31}$$

$$\cos \theta_{ys} = \sin L_y \sin L_s + \cos L_y \cos L_s \cos (\lambda_s - \lambda_y) \tag{32}$$

Expanding $\cos (\lambda_x - \lambda_m)$, $\cos (\lambda_s - \lambda_x)$ and $\cos (\lambda_s - \lambda_y)$ and replacing the two unknowns $L_s$ and $\lambda_s$ by three new unknowns $f$, $g$ and $h$ such that $$f = \cos L_s \cos \lambda_s$$

$$g = \cos L_s \sin \lambda_s$$

$$h = \sin L_s$$

there results three linear equations in $f$, $g$ and $h$ which can be expressed in a matrix as:

$$\begin{pmatrix} \cos L_x \cos \lambda_x & \cos L_x \sin \lambda_x & \sin L_x \\ \cos L_m \cos \lambda_m & \cos L_m \sin \lambda_m & \sin L_m \\ \cos L_y \cos \lambda_y & \cos L_y \sin \lambda_y & \sin L_y \end{pmatrix} \begin{pmatrix} f \\ g \\ h \end{pmatrix} = \begin{pmatrix} \cos \theta_{xs} \\ \cos \theta_{ms} \\ \cos \theta_{ys} \end{pmatrix} \tag{33}$$

Since the matrix (33) depends only on the station coordinates, its inverse $$\begin{pmatrix} C_1 & C_2 & C_3 \\ C_4 & C_5 & C_6 \\ C_7 & C_8 & C_9 \end{pmatrix} / D$$

can be calculated ahead of time, as follows:

$C_1 = \sin L_y \cos L_m \sin \lambda_m - \sin L_m \cos L_y \sin \lambda_y$
$C_2 = \sin L_x \cos L_y \sin \lambda_y - \sin L_y \cos L_x \sin \lambda_x$
$C_3 = \sin L_m \cos L_x \sin \lambda_x - \sin L_x \cos L_m \sin \lambda_m$
$C_4 = \sin L_m \cos L_y \cos \lambda_y - \sin L_y \cos L_m \cos \lambda_m$
$C_5 = \sin L_y \cos L_x \cos \lambda_x - \sin L_x \cos L_y \cos \lambda_y$
$C_6 = \sin L_x \cos L_m \cos \lambda_m - \sin L_m \cos L_x \cos \lambda_x$
$C_7 = \cos L_m \cos L_y (\cos \lambda_m \sin \lambda_y - \sin \lambda_m \cos \lambda_y)$
$C_8 = \cos L_y \cos L_x (\cos \lambda_y \sin \lambda_x - \sin \lambda_y \cos \lambda_x)$
$C_9 = \cos L_x \cos L_m (\cos \lambda_x \sin \lambda_m - \sin \lambda_x \cos \lambda_m)$
$D = \sin L_x \cos L_m \cos L_y (\cos \lambda_m \sin \lambda_y - \sin \lambda_m \cos \lambda_y) +$
$\quad \sin L_m \cos L_y \cos L_x (\cos \lambda_y \sin \lambda_x - \sin \lambda_y \cos \lambda_x) +$
$\quad \sin L_y \cos L_x \cos L_x (\cos \lambda_x \sin \lambda_x - \sin \lambda_y \cos \lambda_x)$ Calculation of these highly symmetric expressions is facilitated in a well known manner in the present invention by an algorithm which permutes X-data, Y-data and M-data. Later, when time differences are observed, there obtains $$f = (C_1 \cos \theta_{xs} + C_2 \cos \theta_{ms} + C_3 \cos \theta_{ys})/D \tag{34}$$

$$g = (C_4 \cos \theta_{xs} + C_5 \cos \theta_{ms} + C_6 \cos \theta_{ys})/D \tag{35}$$

$$H = (C_7 \cos \theta_{xs} + C_8 \cos \theta_{ms} + C_9 \cos \theta_{ys})/D \tag{36}$$

and finally $$L_s = \sin^{-1} h \tag{37}$$

$$\lambda_s = \tan^{-1} (g/f) \tag{38}$$

where the sign of $\lambda_s$ is determined by $$\cos \lambda_s = f / \cos L_s$$

$$\sin \lambda_s = g / \cos L_s$$

This method of computation is employed by the subject invention and is implemented by means of a stored program digital computer.

Figure 3:
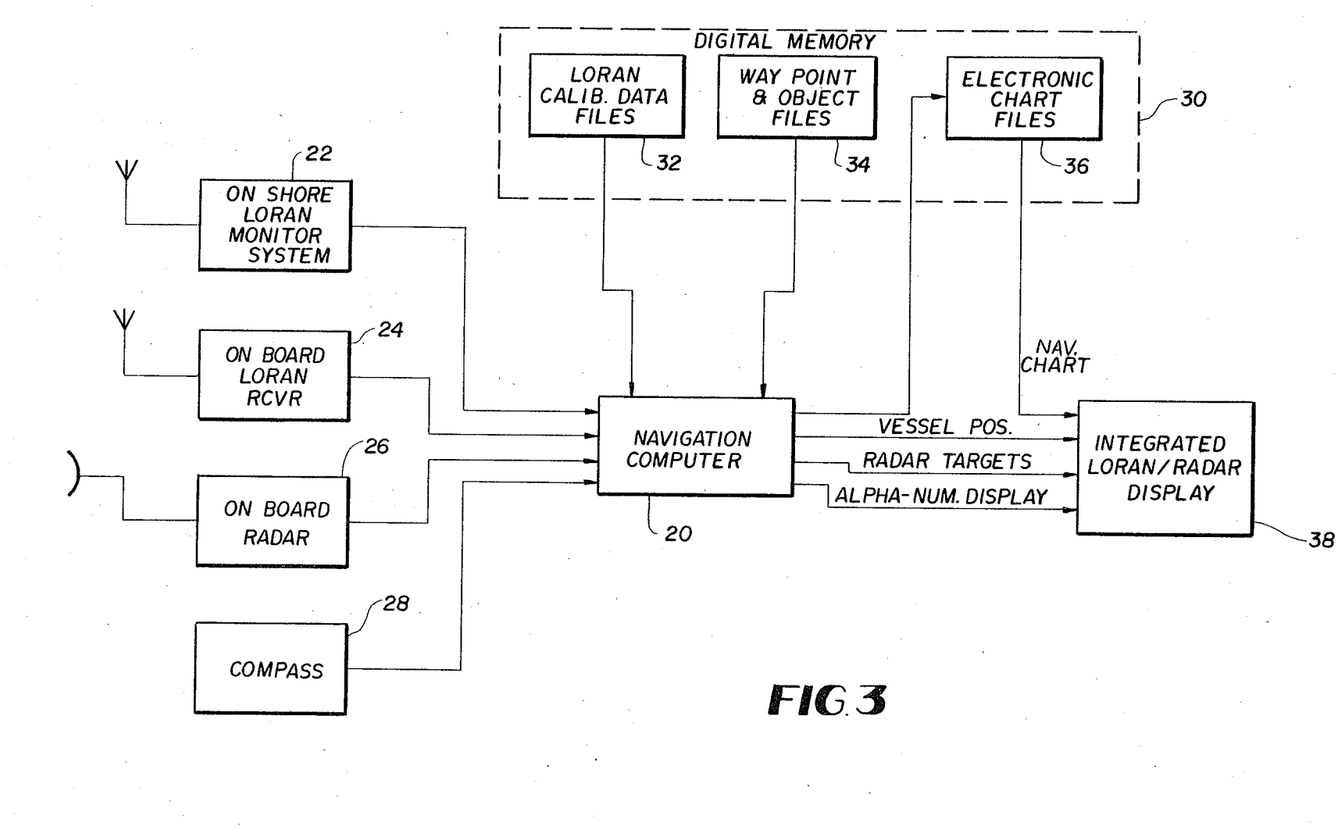
FIG. 3 is a block diagram providing a general overview of the navigational system in accordance with the subject invention.

With the foregoing in mind a preferred embodiment of the invention will now be considered. Referring now to FIG. 3, there is disclosed a block diagram generally illustrative of the basic embodiment of the invention, the details of which are further disclosed in FIGS. 5 and 6. As shown, reference numeral 20 designates a navigation computer 20 which has inputs coupled thereto from several different sources, namely, an on-shore Loran monitor system 22, an on-board Loran receiver 24, an on-board radar system 26, a gyro or magnetic compass 28 and a digital memory 30. The memory 30 contains at least three sets of digital data called files including a first file 32 comprising stored files of the longitudes L and latitudes λ and virtual base line delays $D'_x$ and $D'_y$ of each calibration point where the Loran calibration survey has been previously made as described above. Additionally, the digital memory 30 includes a file 34 comprising preconstructed data files containing information relative to certain way points and objects used in navigating the area of concern. A third file 36 comprises a plurality of electronic charts constructed from actual navigational charts containing longitude and latitude information as to shore contours, channel boundaries, buoys, lighthouses, fixed structures etc. The charts are fed into the memory prior to use and are read out on demand by the navigation computer 20 in response to the vessel's computed position within the area of use for generating a visual map type navigational display. These chart files 36 are, moreover, broken into convenient chart segments, for example, one nautical mile square, and are combined to meet the requirements of any scale chosen by the user. Thus if a three mile square is to be displayed, then nine of the prerequisite one mile square files will be combined to create a chart that portrays the required area.

An integrated Loran/radar display 38 is provided and comprises an electronic chart displayed as a television picture which is presented to the user via a color cathode ray tube, for example, together with a graphic of the vessel's present position on the chart as well as radar targets sensed by the on-board radar 26. Additionally, other calculated alpha-numeric steering and positioning information is displayed alongside of the electronic chart containing the chart generated from the files 36 as well as the radar images; however, the radar's detected image of the shore line and land is suppressed.

Figure 4:
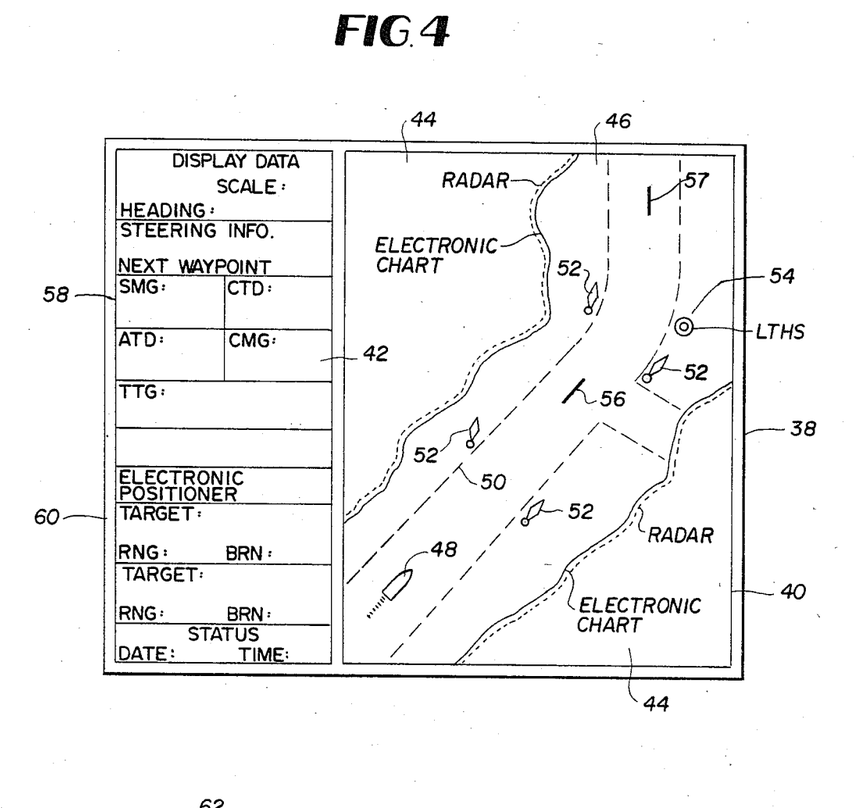
FIG. 4 is illustrative of the navigational display provided by the subject invention.

Such a display is shown in FIG. 4 and comprises a navigational map portion 40 and an alpha-numeric data portion 42. The map portion 40 comprises the composite of a visual image of an electronic navigational chart generated from the chart files 36 and a superimposed radar image whose scale and geographical coordinates match that of the chart generated. The navigational display is in color, which is particularly helpful in delineating the various features portrayed. For purposes of illustration, land masses 44 are colored yellow, while water 46 comprises shades of blue and white. A graphic of the vessel 48 being navigated is colored, for example, in black, as well as any trail it leaves. A channel 50 is delineated by dotted lines colored in blue or green, while buoys and lighthouses designated by reference numerals 52 and 54, respectively, are normally portrayed in their appropriate red and green colors.

In the preferred embodiment of the invention, radar images, depending upon their strength, are colored either red or magenta. Thus any vessels 56, 57 in the vicinity will be so colored, as well as buoys and other features detected. Any movement of buoys from their respective desired position will immediately become evident since the radar image thereof will be offset from the preconstructed position on the chart generated. The radar's land mass echoes, however, will be suppressed, as will be shown subsequently, in favor of the electronic chart portrayal. As a result, the land is shown in the display portion 40 in the form of an accurately drawn high resolution chart in the color yellow as opposed to a relatively smeared and incomplete image of the radar presentation. The use of a color chart in addition to the suppression of land mass echoes in an integrated display including radar images in the water provides a measure of discrimination and intelligence heretofore unavailable.

All moving targets, moreover, are allowed to leave a trail of positions behind them which aids in establishing the direction of their true motion. Also the length of the trail is the measure of the target's speed. Thus the display provides additional information concerning the movements of potential collision threat with any vessels close to the vessel being navigated.

With respect to the alpha-numeric display portion 42, it basically is comprised of two main sections 58 and 60, which are adapted to provide steering information and electronic positioner information, respectively. The steering information is adapted to provide information as to the scale of the portrayed chart on the right, the heading of the vessel, the next way point and such information as "speed made good", "course made good", "time to go", etc. Insofar as the target positioning data, section 60, one or more targets whose range and bearing are calculated is displayed. Also, shown is a status message such as "all okay", as well as the date and time. All of the alpha-numeric information displayed results from inputs to the navigational computer 20 from the way point and destination files 34 as well as calculations resulting from inputs received from the on-board Loran receiver 24 and the on-board radar 26.

Figure 5:
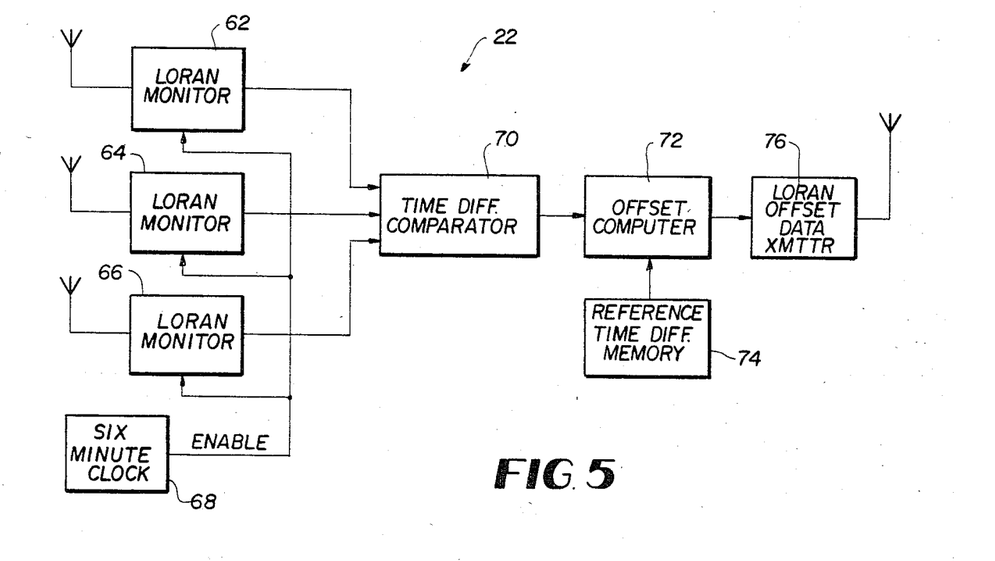
FIG. 5 is a block diagram illustrative of the on-shore Loran monitor system shown in FIG. 1.

Reference will now be made to FIG. 5 where there is disclosed in block diagrammatic form the details of the on-shore Loran monitoring system 22 shown in FIG. 3. As illustrated, the monitor system includes at least three Loran monitors 62, 64 and 66, comprised of Loran receivers located on-shore at three different locations within the area of use. The three monitors are physically separated far enough apart so as not to be influenced by any same local influence and operate to track the Loran grid shift in the area of use by sensing any deviation from respective reference time difference values. When properly operating, a shift of the local Loran grid will be reflected in similar observed time difference changes in one direction or another by at least two but preferably all of the monitors and a plot of observed time difference over a period of time would reflect this. As shown in FIG. 5, the three Loran monitor receivers 62, 64 and 66 are commonly coupled to a clock 68 which is operable to simultaneously enable the three monitors 62, 64 and 66 at six minute intervals which respectively couple time difference outputs to a time difference comparator 70. During the six minutes preceding the enablement, each monitor 62, 64 and 66 operates to accumulate pairs of Loran time differences measured and maintains a running average of the signals at its respective location. Connection between the time difference comparator 70 and the Loran monitors 62, 64 and 66 are typically implemented by means of modems, not shown, because of the separation between the respective equipment which may be several miles. The time difference comparator 70 operates to check the pairs of time differences received by the three monitors. If all three of the monitors 62, 64 and 66 are tracking properly, acceptable comparison differences will be provided and any one of the three monitor outputs can provide the basis for computing a grid offset for the on-board Loran receiver 24 as well as any other Loran receivers in the area of use. If only two of the monitors are tracking, then the comparator 70 will indicate that fact and one of the two monitors which are tracking will be used for obtaining Loran offset corrections. If none of the time differences acceptably compare with any other pair, then none of the monitors can be used for obtaining grid offset corrections, and thus will wait until the next interval or until such time that two agree.

Assuming that two of the Loran monitors 62, 64 and 66 provide Loran time differences that provide an acceptable comparison, one of the tracking monitor outputs is selected and fed to an offset computer 72 which compares the observed time difference readings of the selected monitor with a pair of reference time differences for that particular monitor and which were previously stored in a memory 74, with the difference therebetween being a measure of the grid offset. This offset is coupled as a time difference correction signal to a radio transmitter 76 by means of a modem, for example, not shown, which then transmits the offset correction signal to an on-board radio receiver 78 shown in FIG. 6.

Figure 6:
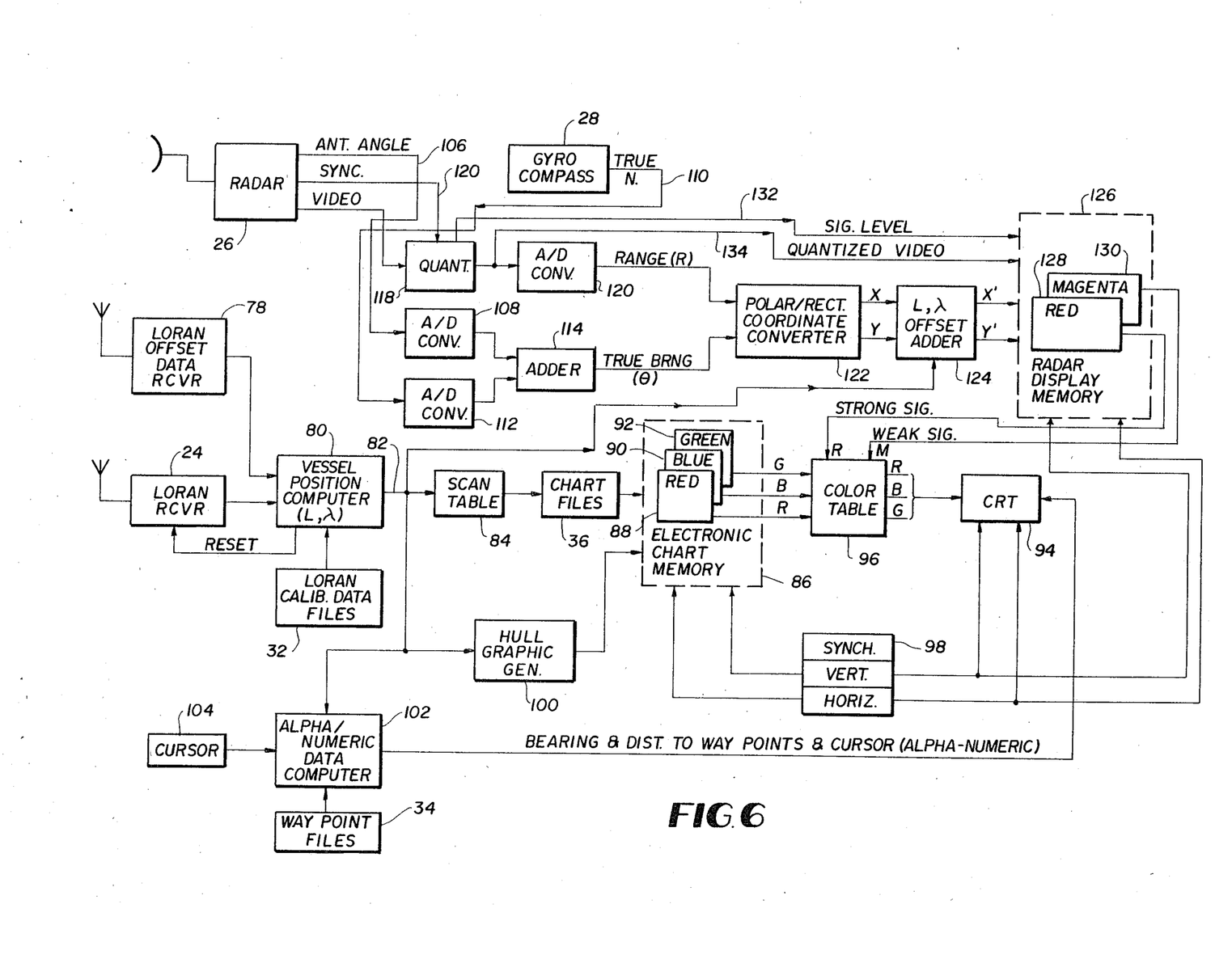
FIG. 6 is a detailed block diagram illustrative of the preferred embodiment of the on-board navigational system in accordance with the subject invention.

Referring now to FIG. 6 which discloses the details of the on-board navigation equipment used to implement the subject invention, time difference readings from the Loran receiver 24 as well as the offset data received by the Loran offset receiver 78 is shown coupled to a means 80 for converting Loran time differences to a geographic position of longitude L and latitude $\lambda$. For purposes of illustration, the means 80 is designated a vessel position computer, which additionally is adapted to receive inputs from the Loran calibration data files 32 (FIG. 3). The vessel position computer 80 is programmed in accordance with the referenced software to accept time differences from the Loran receiver 24 and correct the received time differences in accordance with any grid offset signals received from the offset data receiver 78, whereupon the present position of the vessel 48 (FIG. 4) is computed with a procedure involving equations (1) through (38).

The conversion of Loran time differences to longitude and latitude (L and $\lambda$) is effected in the computer 80 by an iterative converging process which comprises obtaining the proper value of interpolated virtual based line delays $D'_x$ and $D'_y$ from three calibration points which are nearest to the vessel and whose coordinates L and $\lambda$ and virtual base line delays $D'_x$ and $D'_y$ are stored in the calibrating data files 32. In order to interpolate between the three nearest calibration points properly, a first or trial computation of position is made based on observed Loran time difference corrected for any grid shift. Having obtained that position, the calibration files 32 are scanned for these calibration points which are nearest the computed position whereupon interpolated values of base line delay are computed. Using these values of interpolated base line delay, position is recomputed. Values of base line delay are recomputed from the newly recomputed position and a test is made as to whether or not the computed value of virtual base line delay has stabilized within a predetermined tolerance, which if it has, the most recent computed value of position is accepted. If not, the process continues until the computed value of base line delay doesn't change by more than one nonosecond, for example. After a predetermined time interval, e.g. 3 second intervals, the computer 80 resets the Loran receiver 24 to receive a new set of time differences and the position computation process is repeated. The correction for grid offset and this iterative process results in what is termed a differential Loran mode of operation.

The computed vessel position in longitude L and latitude $\lambda$ appears as digital signals on output bus 82 and is entered into a scan table 84 which is operable to select the appropriate electronic navigational chart for display from the chart files 36 contained in the digital memory 30 (FIG. 3). This is a continuing process and selection is based upon whether or not the latitude and longitude of the present vessel position is such to be contained within the outlines of a chart which may already be displayed. In the first instance, however, chart selection is made based upon the vessel's first calculated position. But as the vessel moves, its position gets closer to an internal chart boundary. This boundary is usually set anywhere between three quarters and two thirds of the distance to the outer edge of the chart boundary. This outlines an internal chart of smaller dimension than the actual chart. Upon crossing this boundary, the selection process is resumed to deliver the next chart to the display, and the process continues as the vessel moves throughout the area of travel. When desirable, however, the chart may be made to move while keeping the vessel stationary.

The chart selected from the chart files 36 is fed to a temporary electronic chart memory 86 which comprises three digital memory matrixes 88, 90 and 92 for the colors red, blue and green, respectively, and which operate to provide TV raster outputs to a cathode ray tube (CRT) 94 via a color table 96 which performs the function of controlling the combination of red, blue and green excitation of the CRT 94 in accordance with the rules laid down for the table. The color table comprises a software implementation of a logic gate which provides an inhibitor function. A synchronizer 98 operates to provide both vertical and horizontal sync signals to the chart memory 86 and the cathode ray tube 96 during the generation of a television picture of the selected chart. Each chart in this embodiment of the present invention which is processed for display possesses a set of origin coordinates such as the latitude and longitude of its lower left corner and at a scale that is established by the specification of its north-south and east-west intervals. In addition, there is an internal boundary that is used as a test for the start of an automatic advance of the chart display to the next chart or chart segments required.

Along with the process of selecting and displaying an appropriate navigational chart dependent upon the vessel's computed position, the vessel position computer 80 is also coupled to a hull graphic generator 100 which couples into the electronic chart memory 86 and is operable to generate the picture of the vessel as shown in FIG. 4 at the latitude and longitude coordinates of the vessel's computed position. As shown, this is generated through the color table 96. In the case where the vessel 48 is to be portrayed in the color black, the color table 96 passes the signals from the hull graphic generator 100 to the CRT 94 without change.

In addition to the display of an electronic chart in response to the vessel's computed position, the computed position output bus 82 is coupled to computer means 102 designated an alpha-numeric data computer which also is coupled to the way point files 34 of the digital memory 30 as shown in FIG. 3, which as noted earlier, contains data as to the location of predetermined way points and other objects needed for making a safe passage through the area of use. The computer 102, for example, is operable in accordance with stored programs included in the reference listing to compute bearing and distance to any way point as well as bearing and distance to any other place or object that is determined by the position of a cursor generated by means 104 which can be controlled by the operator. These calculations are a simple matter of taking the vessel's present position and doing known trigonometric relationships that result in the angle and distance from the vessel's location to some pre-selected position. These results are fed out of the computer 102 and operate to generate display section 42 as shown in FIG. 4. In addition to the foregoing calculations, the computer 124 also is adapted to calculate "speed made good" and "course made good" computations from the succession of computed Loran positions outputted from the vessel position computer 104. This is simply a matter of noting the distance traversed during the time it takes to go from one computed position to the next. By noting the difference is position, the "course made good" computation can also be obtained.

Up to this point what has been shown and described is the generation and displaying of an electronic navigational chart including the vessel's location thereon together with selected alpha-numeric data resulting from the operation of a differential Loran position fixing system. This forms one major part of the invention.

However, the present invention has for its further objective the simultaneous display of a map of radar targets detected by the radar 26 against the background of the electronic chart displayed on the CRT 94. The radar signals contain echoes both from land targets as well as targets in and on the water. The latter are desirable and are displayed while the radar's impression of the shore line and adjoining land mass are undesirable and are prevented from being displayed at all as the following discussion will illustrate. In order to combine the radar display with the navigational chart, however, one must first reference the radar echoes received in the geographic framework of the electronic chart generated rather than the attitude or heading of the radar platform, i.e. the vessel 48. The reason for this is that the radar 26 and its scanning antenna is referenced to the vessel and not the chart.

In order to integrate the radar display and chart into a composite display, three analog outputs are obtained from the radar 26 and are shown in FIG. 6 comprising signals of: (a) the scanned antenna azimuth angle relative to the fore and aft of the vessel; (b) the radar's receiver video signals which include target signals; and (c) the radar's synchronizer pulse. The radar image signals of the target echoes i.e. the video signal, is first quantized and digitized for obtaining range and bearing data which is then converted from polar coordinates into coordinates of longitude and latitude. As shown in FIG. 6, range and bearing information is obtained in digital form by first coupling the analog signal of the azimuth angle of the radar antenna and appearing on signal line 106 to a first analog to digital converter 108 while an analog signal appearing on signal line 110 and corresponding to true North compass bearing and provided by the vessel's compass 28, for example, is fed to a second analog to digital converter 112. The digital outputs of the analog to digital vonverters 108 and 112 are added together in a digital adder 114 which is operable to provide digital bearing signals which are referenced to true North. Simultaneously, the radar signal echoes which reside in the video signal output of the radar 26 on signal line 116 are fed to a quantizer 118 which also has the synchronizing pulse applied thereto from signal line 120. The quantized video output signal from the quantizer 18 is fed to a third analog to digital converter 120 which provides a digital output of range of the target images. The outputs R and $\theta$ from A/D converter 120 and the adder 114 are next fed into a polar to rectangular coordinate converter 122 which comprises a digital multiplier. The converter 122 is operable to calculate $X = R \sin \theta$ and $Y = R \cos \theta$ which now comprise digital signals expressed in rectangular X and Y coordinates. The X and Y coordinate signals are next fed to a digital adder 124 which is coupled to the digital output signal bus 82 of the vessel position computer 80. The adder 124 operates to add the offset of the vessel's current position in longitude L and latitude $\lambda$ to the X and Y coordinate signals which operate to inherently and automatically match i.e. align the radar image with the displayed chart so that each target is correctly positioned to a relatively high degree of accuracy on the electronic chart displayed on the CRT 94. In other words, the radar image and the electronic chart will be merged into a composite display.

The quantized video signal from the quantizer 118 is further fed into a temporary radar display memory 126 and target signals are located in either of two matrix memories 128 and 130 calling for the color red or magenta depending upon the signal level of the video signal out of the radar 26 and which appears on signal line 132. For relatively strong signals, the quantized video signals on digital signal bus 134 are stored in X and Y coordinates of the red memory 128 in response to X' and Y' coordinate signals fed out of the offset adder 124, whereas relatively weaker signals are stored in the same fashion in the magenta memory 130. As in the case for the electronic chart memory 86, the radar display memory 126 is controlled by the synchronizer 98 which also controls the CRT 94 and thus operates in timed relationship therewith. Shore contours and the adjacent land mass radar echoes comprise relatively strong target signals and are thus fed into and out of the red memory matrix 128 to the color table 96. Suppression of land echoes including shore contours in favor of that provided by the electronic chart displayed is achieved by means of the color table 96 which operates to inhibit any color signal except yellow from being coupled to the CRT 96 from the memories 86 and 126 if a yellow signal is being fed out of chart memory 86. Since yellow is the color designated for land on an electronic chart, when the electronic chart memory 86 calls for yellow, no red or magenta signals from the radar display memory 126 will be permitted to pass to the CRT 94. However, any red or magenta signals that appear at a time when a color other than yellow is called for, for example blue, green or white, the radar signals colored red or magenta will be passed through the color table 96 to the CRT 94 and will be displayed. Accordingly, all radar return signals will be displayed except those of the shore line and the adjoining land mass.

Thus what is provided is a combined display where the yellow shore line is portrayed in yellow and where the blue water is also capable of displaying red or magenta wherever there is an echo of a ship or other target. In this manner, a clarified display is provided in the sense that instead of seeing a normally relatively fuzzy, smeared and incomplete radar picture, there is presented a sharp yellow drawing of land, while there is provided a clear display of targets that are stationary or moving in the water. Additionally, since a moving target such as a ship is displaced each time a radar sweep occurs, the target will fall in a different place on the screen or the CRT 94 so that a red line is portrayed thereon which results from motion of the target such as another vessel under way. If it is a stationary target such as a lighthouse, the repetitive radar echoes will repetitively be displayed at a single spot. If a buoy, for example, has moved from its designated spot both its present location as provided by the radar and its proper location as provided by the electronic chart will both appear in the composite display. In order to prevent the screen of the CRT 94 from being unduly cluttered with undesirably long tracks, the raster is periodically dumped to provide a fresh image.

Thus what has been shown and described is a new and improved system for radio navigation which is applicable to all vehicles but particularly ships navigating in a harbor or the like. Highly accurate position fixes provided by Loran, for example, is combined with a display of position that is enhanced by means of an integrated display of surrounding targets provided by an object detection system such as radar. While control and computation may be achieved by hardware means, these actions are preferably implemented in software.

While there has been shown and described what is at present considered to be the preferred embodiment of the present invention, modifications thereto will readily occur to those skilled in the art. It is not desired, therefore, that the invention be limited to the specific embodiment shown and described, but it is intended to cover all forms of implementation including all modifications, alterations, changes falling within the true spirit and scope of the invention as defined in the appended claims.

We claim:

1. A radio navigation system for navigating a vehicle, comprising in combination:
   (a) position determining apparatus on-board said vehicle and including means for fixing the present geographical location of said vehicle and generating electrical signals corresponding to said present location;
   (b) means responsive to said electrical signals corresponding to said present geographical location of said vehicle for generating electrical signals of an electronic navigational chart for a predetermined localized area including the present geographical location of said vehicle, said chart including land contours, the adjoining land masses and other fixed objects within the localized area;
   (c) object detecting means on-board said vehicle and including means for generating electrical signals of an electronic map of the surrounding area including land contours, the adjoining land masses, other fixed objects as well as moving objects, and having a scale equal to the scale of said navigational chart;
   (d) means for establishing the geographic center of said map, and accordingly the object detecting means, independently of said object detecting means and generating offset signals corresponding to the vehicle's real time position in longitude and latitude relative to said navigational chart as well as being oriented along a common compass reference;
   (e) means for electronically combining said signals of a navigational chart and said signals of an electronic map in response to said offset signals and generating composite signals therefrom wherein an accurate alignment of said map and said chart is inherently effected automatically; and
   (f) display means coupled to said combining means and being responsive to said composite signals and generating therefrom a composite map type visual display indicating said land contours, said fixed and moving objects for aiding said vehicle navigating through said localized area.

2. The navigation system of claim 1 wherein said position determining apparatus selectively includes Loran, Decca or satellite position determining systems, and said object detecting means selectively includes radar or sonar apparatus.

3. The navigation system of claim 1 wherein said position determining apparatus comprises a Loran position fixing system.

4. The navigation system of claim 1 wherein said object detecting means comprises a radar system.

5. The navigation system of claim 1 wherein said vehicle comprises a vessel navigating in a body of water, said position determining apparatus comprises Loran apparatus and said object detecting means comprises radar apparatus.

6. The navigation system of claim 1 wherein said means for fixing geographical location included in said position determining apparatus (a) comprises computer means responsive to electrical signals generated by said position determining apparatus and generating electrical output signals of said location defined in first type coordinates,
   wherein said navigational chart is also defined in said first type coordinates;
   wherein said map is defined in second type coordinates; and
   wherein said means (e) for electronically combining additionally includes means for converting said second type coordinates of said map to said first type coordinates of said chart, and generating said composite signals defined in said second type coordinates.

7. The navigation system of claim 6 wherein said first type coordinates comprise rectangular coordinates and wherein said second type coordinates comprise polar coordinates.

8. The navigation system of claim 7 wherein said computer means comprises digital computer means generating digital output signals of said location;
   wherein said means (b) for generating an electronic chart includes digital memory means having a plurality of electronic navigational charts digitally stored therein, and including means responsive to said digital output signals of said location for selecting and coupling at least one of said electronic charts to said combining means (f); and
   wherein said combining means includes means for converting said map signals into digital map signals and coupling said digital map signals to said display means in synchronism with said at least one chart selected from memory means.

9. The navigation system of claim 8 wherein said means (e) for combining includes a first temporary digital memory for storing said at least one electronic navigational chart out of said memory means,
   a second temporary memory for storing said digital map signals, and
   means for synchronizing the operation of said first and second temporary memory and said display means for reading signals out of said temporary memories to said display means for generating said composite display.

10. The navigation system of claim 9 wherein said means for combining additionally includes means for preventing predetermined map signals from being displayed.

11. The navigation system of claim 10 wherein said display means comprises color display means, wherein said first and second temporary memories comprise memories for storing chart and map signals in selective colors and wherein said means for preventing predetermined map signals from being displayed comprises means for inhibiting signals from said second temporary memory from being coupled to said color display means when predetermined color signals are being read out of said first temporary memory to said color display means.

12. The navigation system of claim 11 wherein said color display means includes a cathode ray tube and said means for inhibiting comprises a digital color table coupled from said first and second intermediate memory to said cathode ray tube.

13. The navigation system of claim 12 wherein said vehicle comprises a vessel navigating in a body of water, and wherein said map signals prevented from being displayed comprise signals corresponding to the shore line of said body of water and the adjoining land mass.

14. The navigation system of claim 6 wherein said vehicle comprises a vessel navigating in a body of water and said position determining apparatus comprises Loran apparatus including a Loran receiver means on said vessel for coupling time difference signals to said computer means, and additionally including memory means having predetermined data relative to a plurality of calibration points on said body of water stored therein, said computer means being responsive to said difference signals and selected values of said stored data to determine the location of said vessel in accordance with a differential position determining algorithm.

15. The navigation system of claim 14 wherein said Loran apparatus additionally includes means for determining any offset from a Loran grid of the region including said body of water, said offset being expressed in time difference signals, and means coupling said offset time difference signals to said computer means whereby said difference signals received by said Loran receiver means are corrected and said computer means is responsive to said corrected difference signal.

16. The navigation system of claim 15 wherein said means for determining said offset of the Loran grid comprises a Loran monitor system including at least one Loran receiver selectively located in the region of said body of water and generating output signals of the current Loran time difference signals received thereat, means for storing a set of reference time difference signals observed at the selected location, and means for determining any deviation between the current time difference signals and said reference time difference signals, and generating deviation time difference signals therefrom said deviation time difference signals thereafter being applied to said means coupling said offset time difference signals to said computer means.

17. The navigation system of claim 16 wherein said Loran monitor system includes a plurality of Loran receivers located at selected locations in said region and generating respective current Loran time difference signals, means coupled to the respective current time difference signals for comparing said repsective current time difference signals and providing one time difference signal output when at least two of said Loran receivers provide time difference signals in a predetermined comparison range, said one time difference signal thereafter being applied to said means coupling said offset signals to said computer means.

18. The navigation system of claim 16 wherein said means coupling said offset time difference signals to said computer means includes off-vessel radio transmitter means and on-board radio receiver means, said transmitter means being coupled to said Loran monitor system for sending said signals to said on-board radio receiver means coupled to said computer means.

19. The navigation system of claim 1 wherein said means (e) for combining additionally includes means for blocking signals of said land contours and adjoining land masses generated by said object detecting means in favor of land contour and land mass signals of said navigational chart, whereby said display means only generates a display of the land contours and land masses included in said navigational chart along with said fixed and moving objects.

20. The navigation system of claim 1 wherein said display means comprises a color display, and
wherein said means (e) for combining includes means for designating predetermined colors for said navigational chart and said map, and means for inhibiting the display of map signals when the color designated for land contours and land masses of said navigational chart is present thereby inhibiting land contour and land mass signals detected by said object detecting means from being displayed while displaying corresponding land contour and land mass signals of said navigational chart.

21. The navigation system of claim 1 and additionally including means responsive to said electrical signals corresponding to said present geographical location of said vehicle for generating and coupling signals to said display means of predetermined alpha-numeric navigational data, said display means displaying said alpha-numeric data adjacent said composite map type display.

22. A method of navigating a vehicle, comprising the steps of:
(a) fixing the present geographical location of said vehicle within a predetermined localized area and generating electrical signals corresponding to said present location;
(b) generating an electronic navigational chart in response to said electrical signals and including land contours, land masses and other fixed objects in said localized area;
(c) detecting objects in said localized area on board said vehicle and generating electrical signals for an electronic map of the detected land contours, land masses, other fixed objects as well as moving objects in said localized area;
(d) establishing the geographic center of said map independently of detecting objects in accordance with step (c) and generating offset signals corresponding to the vehicle's real time position in longitude and latitude relative to said navigational chart as well as being oriented along a common compass reference;
(e) electronically combining said signals of a navigational chart and said signals of a map in response to said offset signals and generating composite signals therefrom wherein an accurate alignment of said map and said chart is inherently effected automatically when displayed; and
(f) generating a composite map type visual display indicating said land contours, land masses, said fixed and moving objects for aiding said vehicle navigating through said localized area.

23. The method of claim 22 wherein said step (e) of combining additionally includes the step of blocking land contour and land mass signals generated by said object detecting step (c) in favor of land contour signals of said navigational chart generated by step (b), whereby said composite map type display excludes detected land contours and land masses while displaying corresponding land contours and land masses of said navigational chart along with detected fixed and moving objects.

24. The method of claim 22 wherein said composite map type display comprises a color display, and wherein said combining step (e) includes the step of assigning predetermined colors for the elements of said electronic chart and said electronic map, and thereafter inhibiting the display of map signals when the color assigned for land contours and land masses of said chart are present thereby preventing the detected land contour and land mass signals from being displayed while displaying corresponding land contour signals of said navigational chart.

25. The method of claim 22 wherein said step (a) of fixing the geographical location of said vehicle comprises utilizing a Loran, Decca or satellite position determining system, and wherein said step (c) of detecting objects comprises utilizing a radar or sonar system.

26. The method of claim 22 wherein said vehicle comprises a vehicle navigating in a body of water, wherein said step (ca) of fixing present geographical location comprises the method of Loran position fixing.

27. The method of claim 26 wherein said step of Loran position fixing includes, initially obtaining predetermined data at a plurality of accurately known calibration points for calculating position within said area of navigational use, storing said data for subsequent use, receiving signals of the arrival of radio signals transmitted from a master station and at least two secondary stations and generating at least two time difference signals therefrom, and utilizing said time difference signals and selected stored data of at least one of said calibration points and calculating therefrom said present position in accordance with a differential position fixing algorithm.

28. The method of claim 27 wherein said predetermined data comprises calculated values of virtual base line shifts between said master and two secondary stations based upon the time difference signals observed at each of said plurality of calibration points.

29. The method of claim 28 wherein said step of Loran position fixing additionally includes the further step of tracking any shift of the Loran grid within said area of navigational use and generating offset signals of the grid shift, said grid comprising a family of intersecting hyperbolic loci which represent the locus of all points possessing predicted equal difference in time of arrival between said master and said secondary stations, receiving said offset signals, utilizing said time difference signals and said offset signals and generating therefrom corrected time difference signals, and thereafter utilizing said corrected time difference signals and said selected stored data of at least one of said calibration points and calculating said present position in accordance with said position fixing algorithm.

30. The method of claim 29 wherein said step of tracking the Loran grid further comprises the steps of locating a plurality of Loran receivers at selected locations in said region of use, receiving signals from said master and secondary station and generating respective Loran time difference signals thereat, comparing the respective Loran time difference signals and providing one time difference signal output when at least two of said Loran receivers provide output signals in a predetermined comparison range, and utilizing said one time difference signal for generating corrected time difference signals.

31. The method of claim 29 wherein said algorithm comprises an iterative converging process including the steps of obtaining an interpolated value of virtual base line delays from three calibration points nearest to said vessel following initially computing a position fix based on observed time difference signals at the present location of the vessel and corrected for any shift of the Loran grid.

32. The method of claim 22 wherein said step (a) of fixing geographical location includes calculating the present position in response to received position fixing signals transmitted from one or more remote signal sources, said calculating step further comprising the step of generating digital output signals of present position defined in first type coordinates, wherein said step (b) of generating an electronic chart includes the step of generating a navigational chart also defined in said first type coordinates, wherein said step (c) of detecting objects further comprises the step of generating signals for said map defined in second type coordinates; and wherein said step of (e) combining includes the step of converting said second type coordinates of said signals for said map to said first type coordinates, adding said offset signals to said signals for said maps converted to said first type coordinates, and thereafter generating said composite signals.

33. The method of claim 32 wherein said first type coordinates comprise rectangular coordinates and wherein said second type coordinates comprise polar coordinates.

34. The method of claim 33 and wherein said step of calculating position comprises the step of digitally calculating present position of said vehicle and generating digital output signals of said present position;

wherein said step of generating an electronic chart includes digitally generating and storing signals for a plurality of electronic navigational charts, and selecting at least one of said stored navigational charts in response to said digital output signals of said present position , and wherein said step (c) of generating electrical signals for an electronic map includes converting said signals to digital signals.

35. The method of claim 34 and wherein said step (e) of combining additionally includes the step of preventing predetermined objects detected in step (c) from being displayed in step (f).

36. The method of claim 35 wherein said step (e) of combining includes the further steps of temporarily storing the navigational chart selected, temporarily storing said signals for said map following the adding of said offset signals thereto and synchronously reading out said navigational chart and said map temporarily stored and thereafter inhibiting predetermined map signals which correspond to like portions of said chart prior to said step (f) of generating said display whereby said composite map type display excludes predetermined portions of said map in favor of a displayed like portion of said chart.

37. The method of claim 36 wherein said step (f) of generating a composite map type visual display comprises generating an electronic display in color, and wherein said steps of temporarily storing said selected chart and said map signals comprises storing signals thereof in selected colors, and wherein said step of inhibiting predetermined map signals comprises inhibiting the color for map signals when a predetermined color signal of said chart is being read out after being temporarily stored.

38. The method of claim 37 wherein said vehicle comprises a vessel navigating on a body of water, wherein said step of fixing the geographical location of said vessel comprises utilizing Loran position fixing apparatus and wherein said step of detecting objects comprises the step of utilizing radar type apparatus, and wherein said step of inhibiting predetermined map signals comprises inhibiting map signals in the color corresponding to the shore line of said body of water and adjoining land masses when the color for said shore line and adjoining land masses of said chart is being read out.

39. The method of claim 38 and additionally including the step of generating and displaying a visual graphic of said vessel on said chart at the present calculated location of said vessel.

40. The method of claim 38 and additionally including the step of generating predetermined alpha-numeric navigational data in response to the electrical signals generated corresponding to the calculated present location of said vessel and displaying said alpha-numeric navigational data adjacent said composite map type visual display.

41. The method of claim 22 and additionally including the step (g) of generating predetermined alpha-numeric navigational data in response to the electrical signals generated corresponding to present location of said vehicle and displaying said alpha-numeric navigational data adjacent said composite map type visual display.

* * * * *